US009867268B2

(12) United States Patent
Currier et al.

(10) Patent No.: US 9,867,268 B2
(45) Date of Patent: Jan. 9, 2018

(54) COOLING PLASMA TORCH NOZZLES AND RELATED SYSTEMS AND METHODS

(71) Applicant: Hypertherm, Inc., Hanover, NH (US)

(72) Inventors: Brian J. Currier, Newport, NH (US); John Peters, Canaan, NH (US); Steve Dunbar, Lebanon, NH (US)

(73) Assignee: Hypertherm, Inc., Hanover, NH (US)

( * ) Notice: Subject to any disclaimer, the term of this patent is extended or adjusted under 35 U.S.C. 154(b) by 0 days.

(21) Appl. No.: 15/176,989

(22) Filed: Jun. 8, 2016

(65) Prior Publication Data

US 2016/0360601 A1    Dec. 8, 2016

Related U.S. Application Data

(60) Provisional application No. 62/172,589, filed on Jun. 8, 2015.

(51) Int. Cl.
   *B23K 10/00* (2006.01)
   *H05H 1/28* (2006.01)
   *H05H 1/34* (2006.01)

(52) U.S. Cl.
   CPC .............. *H05H 1/28* (2013.01); *B23K 10/00* (2013.01); *H05H 1/34* (2013.01); *H05H 2001/3457* (2013.01)

(58) Field of Classification Search
   CPC .... H05H 1/28; H05H 1/34; H05H 2001/3457; H05H 2001/3478; B23K 10/00
   USPC ....................... 219/121.49, 121.5, 121.51, 75
   See application file for complete search history.

(56) References Cited

U.S. PATENT DOCUMENTS

| 5,308,949 | A | 5/1994 | Reed, Jr. et al. |
| 5,660,743 | A | 8/1997 | Nemchinsky |
| 6,919,526 | B2 | 7/2005 | Kinerson et al. |
| 7,598,473 | B2 | 10/2009 | Cook et al. |
| 8,698,036 | B1 * | 4/2014 | Zhang ...................... H05H 1/34 219/121.49 |
| 8,829,385 | B2 * | 9/2014 | Yang ...................... B23K 10/00 219/121.48 |
| 9,131,596 | B2 | 9/2015 | Conway et al. |
| 2003/0034333 | A1 * | 2/2003 | Horner-Richardson . H05H 1/34 219/121.51 |
| 2004/0169018 | A1 * | 9/2004 | Brasseur ................ B23K 10/00 219/121.5 |
| 2005/0082263 | A1 * | 4/2005 | Koike ...................... H05H 1/28 219/121.49 |
| 2008/0217305 | A1 * | 9/2008 | Sanders ................... H05H 1/28 219/121.49 |

(Continued)

FOREIGN PATENT DOCUMENTS

| FR | 2703557 | 10/1994 |
| WO | 03089183 | 10/2003 |
| WO | 2015025819 | 2/2015 |

*Primary Examiner* — Mark Paschall
(74) *Attorney, Agent, or Firm* — Proskauer Rose LLP

(57) ABSTRACT

In some aspects, nozzles for a plasma arc torch can include a first body having a first end, a second end, and a longitudinal axis; and a second body disposed about a portion of the first body to complement the first body, the second body defining a set of channels formed on an internal surface shaped to form a set of liquid flow passages between the first body and the second body, the second body at least partially defining at least one inlet and at least one outlet to the set of liquid flow passages.

26 Claims, 6 Drawing Sheets

(56) References Cited

U.S. PATENT DOCUMENTS

| | | | |
|---|---|---|---|
| 2009/0230097 A1* | 9/2009 | Liebold | H05H 1/34 219/121.49 |
| 2011/0108528 A1* | 5/2011 | Laurisch | H05H 1/34 219/121.5 |
| 2011/0284502 A1* | 11/2011 | Krink | H05H 1/28 219/121.5 |
| 2012/0055906 A1* | 3/2012 | Shipulski | B23K 10/00 219/121.49 |
| 2012/0138579 A1* | 6/2012 | Krink | H05H 1/28 219/121.5 |
| 2012/0138580 A1* | 6/2012 | Krink | H05H 1/28 219/121.5 |

\* cited by examiner

COOLING PLASMA TORCH NOZZLES AND RELATED SYSTEMS AND METHODS

TECHNICAL FIELD

This disclosure relates generally to material processing systems, and more specifically to cooling plasma torch nozzles and related systems and methods.

BACKGROUND

Plasma arc torches are widely used for cutting and marking metallic materials. A plasma arc torch generally includes a torch body, an electrode (i.e., a cathode) mounted within the body, passages for cooling and arc control fluids, a swirl ring to control the fluid flow patterns, a nozzle (i.e., an anode) with a central exit orifice, electrical connections, and a power supply. The torch produces a plasma arc, which is a constricted ionized jet of a plasma gas with high temperature and high momentum. A shield may also be employed to provide a shield gas flow to the area proximate the plasma arc. Gases used in the torch can be non-reactive (e.g., argon or nitrogen), or reactive (e.g., oxygen or air).

In operation, a pilot arc is first generated between the electrode and the nozzle. The pilot arc ionizes gas passing through the nozzle exit orifice. As the ionized gas reduces the electrical resistance between the electrode and the workpiece, the arc transfers from the nozzle to the workpiece. The torch may be operated in this transferred plasma arc mode, which is characterized by the conductive flow of ionized gas from the electrode to the workpiece, for the cutting of the workpiece.

Cooling consumables (e.g., the nozzle) of a plasma arc torch with a cooling liquid (e.g., water) can have safety and performance benefits. Without liquid cooling, the consumables can reach extremely high temperatures that can pose a safety issue during use. A lossless cooling system can allow the use of a dry plasma and a dry cutting table. Dry tables can be desirable due to the reduced mess and elimination of the need to dispose of the used/contaminated water, which can be considered to be hazardous waste.

SUMMARY

In some aspects, nozzles for plasma arc torches can include a first body having a first end, a second end, and a longitudinal axis; and a second body disposed about a portion of the first body to complement the first body, the second body defining a set of channels formed on an internal surface shaped to form a set of liquid flow passages between the first body and the second body, the second body at least partially defining at least one inlet and at least one outlet to the set of liquid flow passages.

Embodiments described herein can include one or more of the following features.

In some embodiments, the set of liquid flow passages form a coolant loop. The second body can be formed of an electrically insulative material. In some embodiments, an outer surface of the second body defines a set of annular channels, a first annular channel of the set is fluidly connected to the at least one inlet and a second annular channel of the set is fluidly connected to the at least one outlet. The set of channels can be defined by a set of flow features along the internal surface of the second body to define at least a portion of the liquid flow passages. The first body can be rotationally symmetric about the longitudinal axis. The set of liquid flow passages can include at least one annular passage, at least one of the annular passages being formed at an end of the set of channels formed on the internal surface. The second body can include an electrically insulative portion. In some embodiments, the nozzles can include a fluid seal formed between the first body and the second body.

In some aspects, nozzles for liquid-cooled plasma arc torches can include a first body comprising a distal end, a proximal end, and a central axis; and a shell, formed of a non-electrically conductive material, disposed about a portion of the first body, the first body and the shell together defining a fluid flow path shaped to direct coolant flow between the first body and the shell.

Embodiments described herein can include one or more of the following features.

In some embodiments, the non-electrically conductive material can include a plastic material. The shell can be substantially fully formed of the non-electrically conductive material. The shell can be partially formed of an electrically conductive material. The shell can include a coating of the non-electrically conductive material. The fluid flow path can be defined by one or more features extending from an internal surface of the shell. The first body and the shell can be snap-fit to one another. The shell can limit electrical arcing between the nozzle and an adjacent shield.

In some aspects, nozzles for liquid-cooled plasma arc torches can include a conductive body having a first end, a second end, and a longitudinal axis; and a second body, formed of a non-electrically conductive material, disposed about a portion of the conductive body, the second body comprising: an internal surface shaped to complement the conductive body to form a set of fluid flow passages forming a liquid cooling loop between the conductive body and the second body; and an outer surface defining a set of annular channels, an inlet to the liquid cooling loop being at least partially defined within a first annular channel of the set and an outlet to liquid cooling loop being at least partially defined within a second annular channel of the set, the first annular channel being disposed at a closer longitudinal position to the second end than the second annular channel.

In some aspects, nozzles for liquid-cooled plasma arc torches can include a first body having a first end, a second end, and a longitudinal axis, the first body comprising an outer axial alignment flange having a proximal surface configured to mate with a torch body and an opposing distal surface exposed to liquid coolant flow; and a second body disposed about a portion of the first body, the second body comprising: an outer surface defining a set of annular channels, at least one inlet to a liquid cooling loop being at least partially defined within a first annular channel of the set and at least one outlet to the liquid cooling loop being at least partially defined within a second annular channel of the set, the distal surface of the alignment flange and the first annular channel together forming the inlet.

Embodiments described herein can include one or more of the following features.

In some embodiments, the first annular channel is disposed at a closer longitudinal position to the second end than the second annular channel. The first annular channel and the second annular channel can be separated by an annular flange extending from the outer surface of the second body. The at least one inlet can span about 5 percent to about 35 percent of the circumference of the second body. The first annular channel can also be defined by the alignment flange. In some embodiments, an axial length of the first annular channel has an axial length that is greater than an axial length of the second annular channel.

In some aspects, nozzles for liquid-cooled plasma arc torches can include a first body having a forward end, a rear end, and a longitudinal axis, the first body comprising an outer axial alignment flange disposed between the forward end and the rear end, the outer axial alignment flange having the largest diameter of the nozzle and having a rear face to directly align the nozzle with a torch body thereby positioning an exit orifice of the nozzle relative to an electrode installed in the torch body and a front face that forms at least a portion of an inlet passage of a coolant channel; and a shell disposed about a portion of the first body and forming a sealed forward end with the first body, the first body and the shell together defining the coolant channel between the first body and the shell.

Embodiments described herein can include one or more of the following features.

In some embodiments, the first body and the second body together define a channel around a perimeter of the nozzle for coolant to flow around and then into the shell. The shell can define a coolant inlet and a coolant outlet at its rear end. The first body can define a step feature at its forward end. Red circle below is showing the step feature discussed. The step feature can engage the forward end of shell to set an axial length of the coolant channel. In some embodiments, the nozzle also includes a sealing element disposed at the sealed forward end to retain coolant within the coolant channel.

Embodiments described herein can have one or more of the following advantages.

The systems and methods described herein having a multi-component (e.g., two piece, three piece, etc.) nozzle can be used to obtain better cut quality over the life of the nozzle and reduce manufacturing costs as compared to some conventional systems. As described herein, the multi-component nozzle can be used to direct coolant closer to the central region of the nozzle (e.g., towards the nozzle bore through which the plasma travels), which can help to allow for optimized bore dimensions and performance via improved cooling. For example, conventional liquid cooled (e.g., mechanized) plasma nozzles typically keep coolant at a distance from the nozzle bore (e.g., only applying coolant to outer surfaces axially distant from the nozzle orifice), which can make it difficult to remove heat from the area to limit the wear and damage caused by heat build-up in the nozzle. Due to the cooling limitations in some conventional designs, these conditions can limit design choices and restrict nozzle bore dimensions, resulting in poor cut quality over life.

The systems and methods described herein can result in improved nozzle cooling being achieved and therefore nozzle bore dimensions (i.e., arc current density) can be designed to meet desired cut speeds and dross-free cutting requirements, for example, as a result of improved cooling. In some cases, the systems and methods can also satisfy the cut quality over life target for cutting processes being developed by plasma cutting system designers and manufacturers.

In addition, in some aspects, the systems and methods described herein having a multi-component nozzle where the outer component includes the flow features defining the internal coolant flow passages and where the interior component is generally rotationally symmetric can be easier and/or cheaper to manufacture than some other conventional nozzles, for example those having flow features defined along the inner component. For example, in some nozzles, an inner component is typically made from a material that is desired for electrical and thermal management performance, such as copper. Whereas, an outer component as described herein, being configured primarily to direct a coolant flow rather than to provide electrical properties to the nozzle, can be formed of various materials and manufactured by any of various techniques, which may be undesirable for use in the interior component from a cost standpoint. In some cases, the manufacturing methods implemented to form the outer components can include those which were previously not used, or were even discouraged from being used, for making plasma cutting consumables. For example, outer components, which can include asymmetric features can be formed by molding (e.g., injection molding plastics), cold forming, casting, three-dimensional printing, etc. This can reduce the number of features needed to be manufactured (e.g., machined) in the interior nozzle component, reducing manufacturing time and waste material (e.g., copper chips). This can be particularly useful because the interior component is typically the component that undergoes the most thermal and electrical stresses during use, which results in material breakdown and failure. Further, removing flow directing features from the interior component can reduce manufacturing waste of the materials used, which could result from cutting away such materials from the interior component. Instead, more complex geometries can be formed by the outer components by materials that lend themselves to more desirable manufacturing processes.

Additionally, in some aspects, the systems and methods described herein having an outer component that can be made of (either completely or partially) of a non-electrically conductive material can be used to limit electrical arcing between the nozzle and an adjacent shield component, which can reduce the need for an additional component to electrically separate the nozzle and shield. As a result, the systems and methods described herein can reduce the cost and complexity of the torches in which they are used.

DETAILED DESCRIPTION

In some aspects, a plasma torch nozzle can be formed of multiple components, including an inner component and an outer component where one or more liquid coolant paths are formed there between for cooling the nozzle. In some cases, the coolant paths are defined by features extending from the interior surface of the outer component. In some cases, the outer component can be formed of an electrically insulative material, such as a plastic.

Figure 1:
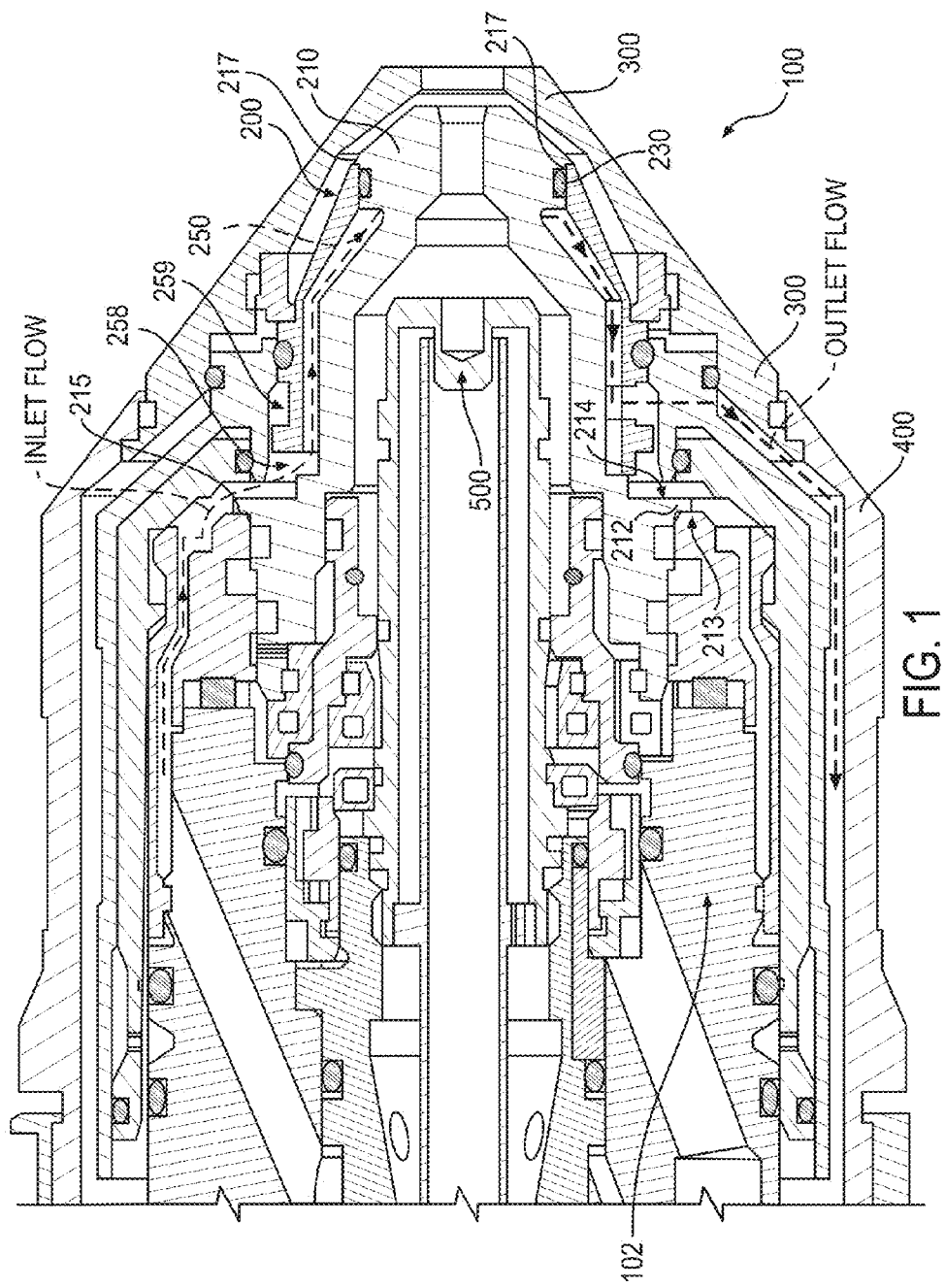
FIG. 1 is a cross-sectional view of an example plasma torch having a two-piece nozzle defining internal coolant flow paths.

Referring to FIG. 1, a material processing head 100 of a material processing device, such as a plasma arc torch (e.g., a liquid cooled plasma arc torch), can include a material processing head body 102 and multiple consumable components removably attached to the material processing head body 102. For example, the consumable components can include a nozzle 200, a shield 300, a shield retaining cap 400, and an electrode 500. As illustrated, the nozzle 200 can be formed of multiple components including an inner component 210 and an outer component 250. The plasma arc torch can be in electrical communication (e.g., using a current-carrying cable (not shown)) with a power supply (not shown) and receive electrical current from the power supply. The electrical current received from the power supply is transferred, through a current path, to the electrode 500 toward the nozzle 200.

During use, gas (e.g., plasma gas) is directed into a plenum region defined between the electrode 500 and the nozzle 200. The plasma gas can be accelerated (e.g., the plasma gas can be heated, which reduces density of the gas as the plasma is formed, which increases its volume and velocity) within the plasma plenum to generate a plasma stream via an electrical plasma arc created between the electrode 500 and the nozzle 200.

Experimental studies have indicated that the temperature of a nozzle during the use of the plasma torch can have a significant impact on electrode and nozzle life. Accordingly, increased cooling can be a useful technique in extending or prolonging the usable life span of an electrode and/or a nozzle. Cooling can be achieved by directing coolant (e.g., a liquid coolant, such as water) through the electrode and/or nozzle surfaces. The flow of coolant through these elements (e.g., electrode or nozzle) can be directed along internal and/or external surfaces in one or more different coolant loop cycles. As discussed herein, the plasma arc torch can be cooled by directing one or more liquid coolant flows through various channels defined within and through the nozzle.

Referring to FIGS. 2-6, for example, in some embodiments, a nozzle 200 includes a first body (e.g., the inner component) 210 that has a forward, distal first end 211A, a rear, proximal second end 211B, and a longitudinal axis 211C. The inner component 210 can be configured at its proximal end 211B to connect to the torch body 102. For example, the inner component 210 can include an alignment feature (e.g., an outer axial alignment flange) 212 to interface (e.g., directly interface) with the torch body 102 or another interfacing component disposed in the torch body, such as a swirl ring. In some cases, the alignment flange 212 defines the greatest width of the nozzle. The outer alignment flange 212 can define a proximal surface 213 configured to mate with the torch body. The outer alignment flange 212 can be used to position the nozzle axially within the torch. Axial alignment of the nozzle within the torch can set the position of the nozzle exit orifice relative to the electrode 500 as well as to the shield 300. The proximal side of the alignment flange 212 can also define a radial alignment feature 215 that can help position the nozzle generally centrally within the torch body. For example, the radial alignment feature 215 can be a step feature.

An opposing distal surface 214 of the flange 212 can be exposed to liquid coolant flow, for example, being delivered to cool the nozzle, as discussed below. As discussed below, the distal surface 214 of the flange exposed to coolant flow can be configured to receive liquid coolant delivered from the torch body, distribute the coolant around the perimeter of the nozzle, and deliver it (e.g., deliver the coolant substantially evenly) to the one or more coolant inlets 204 of the nozzle.

The inner component can include a generally cylindrical body portion 220 (shown in FIG. 3) around which the outer component 250 can be disposed. In some embodiments, the distal end 211A extends longitudinally beyond the outer component 250. The generally cylindrical body portion 220 is configured to be cooled by a liquid coolant flow applied thereto. In some embodiments, the inner component 210 can be substantially rotationally symmetric about the longitudinal axis 211C. As such, the nozzle can be installed in the torch in many, substantially infinite, different rotationally oriented positions for use. Such flexible installation helps to make the nozzle easier and faster to install and use within the torch. Additionally, using a substantially symmetrical inner component, generally free from axisymmetric flow directing features can make the inner component simpler (e.g., easier, cheaper, etc.) to manufacture than if it were to include one or more discrete flow features around its outer surface. Additionally, removing flow directing features from the interior component can reduce manufacturing waste of the materials used (e.g., copper), which is typically more expensive than other materials that can be used for other components, such as plastic or less expensive metals, such as brass or steels. For example, not having axisymmetric flow channels on the interior components can reduce manufacturing waste and time, which could result from machining processes cutting away material to form such axial flow channels.

The nozzle also includes a second body (e.g., the outer component, shell) 250 (shown in FIG. 4) arranged or disposed around at least a portion of the first body 210. The outer component 250 typically defines a set of flow channels 252 formed along its internal surface 254. The flow channels 252 are shaped to complement (e.g., contact) a surface of the inner component 210 to form a set of liquid flow passages between the inner component 210 and the outer component 250. The outer component 250 defines at least one inlet 204 of the liquid flow passages between the inner and outer components and at least one outlet 206 (shown in FIG. 2) of the liquid flow passages between the inner and outer components. During a cooling operation of the torch, coolant (e.g., a liquid coolant) can enter the nozzle 200 through the inlet 204, flow through the liquid flow passages to cool thereby cooling the nozzle components (particularly the inner component 210), and flow from the nozzle via the outlet 206. The liquid flow passages thus form a coolant loop within the nozzle to create a closed (e.g., lossless) coolant loop where coolant is limited (e.g., prevented) from being expelled from the nozzle at its distal end 211A. The liquid flow passages define a path between first body/inner component 210 and outer component/second body 250 through nozzle 200, this path passes the liquid across surfaces of components 210 and 250 and proximate distal end 211A and thus near the plasma exit orifice and the highest thermal extremes experienced by nozzle 200. The presence of this coolant close to the orifice improves consumable life and performance.

The nozzle can include any number of inlets and outlets based on the cooling requirements and the desired flow passages. For example, in some embodiments, the nozzle can have one inlet 204 and one outlet 206. In some cases, the one inlet and one outlet can be positioned at opposite sides (circumferentially) of the nozzle relative to one another. For example, the inlet and outlet can be positioned about 180 degrees away from one another relative to the longitudinal axis 211C. In some embodiments, the nozzle can include multiple inlets 204 and multiple outlets 206. For example, the nozzle can include two inlets 204 and two outlets 206. The inlets and outlets can be evenly spaced around the nozzle such that the two inlets 204 are on opposite sides of the nozzle and the two outlets 206 are on opposite sides of the nozzle, and each inlet can be positioned about 90 degrees from an adjacent outlet. This spacing allows for fresh coolant flow (entering the nozzle) to be distant relative to used/warmed coolant flow which has already passed through the nozzle and is exiting the nozzle. In some embodiments, inlet 204 and outlet 206 maybe axially spaced relative to one another such that either inlet 204 or outlet 206 is closer to the nozzle exit orifice than its counterpart.

Figure 2:
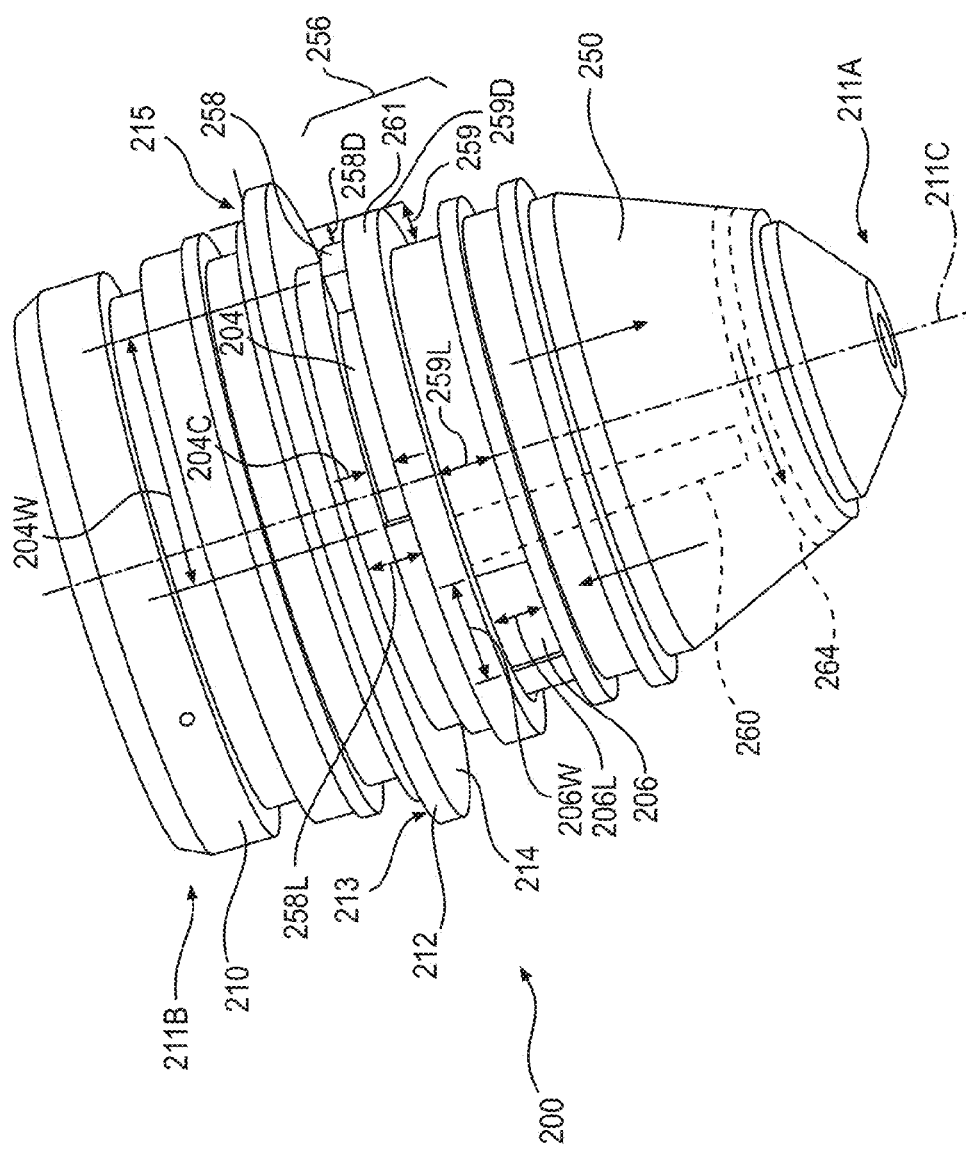
FIG. 2 is a perspective view of an example two-piece nozzle defining coolant flow paths between an internal component and an external component.
Figure 3:
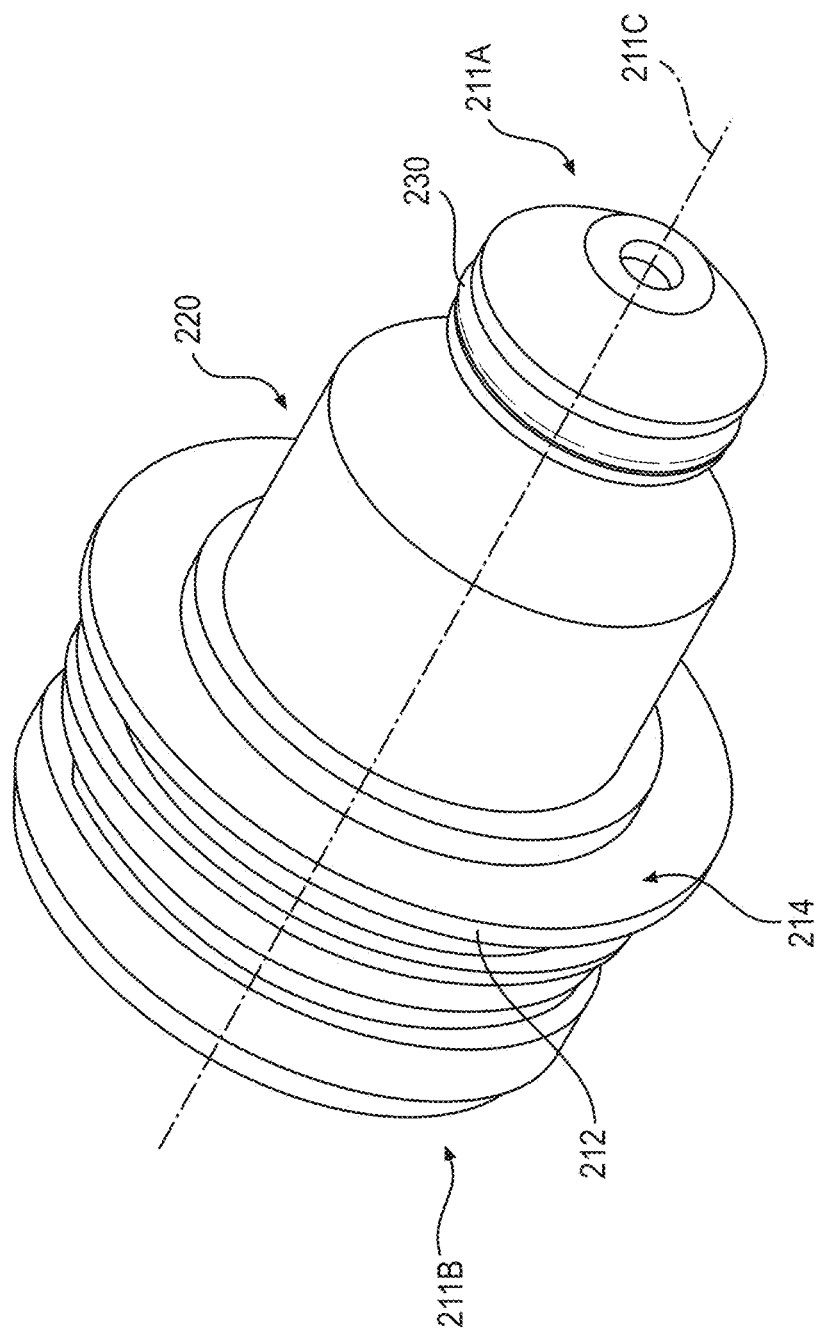
FIG. 3 is a perspective view of an outer surface of an example inner component of the two-piece nozzle.

The inlets and outlets can be sized and configured to create any of various flow characteristics flowing into and out of the nozzle. In some embodiments, the at least one inlet 204 can be sized to form one or more openings that span about 5 percent to about 35 percent (e.g., about 22 percent to about 25 percent) of the circumference of the outer component 250. In some embodiments, the at least one outlet 206 can be sized to form one or more openings that spans about 5 percent to about 35 percent (e.g., about 22 percent to about 25 percent) of the circumference of the outer component 250. As depicted in FIG. 2, in some embodiments, the at least one inlet 204 can be in the form of slots having a circumferential width 204W that is greater than their axial length 204L. For example, the circumferential width of the inlets 204 can be about 80 degrees and an axial length can be about 0.06 inches (e.g., about 1.52 mm). Additionally, in some embodiments, the at least one outlet 206 can be in the form of slots having a circumferential width 206W that is greater than their axial length 206L. For example, the circumferential width of the outlets 206 can be about 90 degrees and an axial length can be about 0.063 inches (e.g., about 1.6 mm).

The outer surface of the outer component can define a set of annular channels 256 around the perimeter of the nozzle that can be configured to engage with other components of the torch to facilitate torch operation, such as to provide fluid flow to and from the nozzle 200. In some embodiments, a first annular channel 258 is fluidly connected to the at least one inlet 204 and a second annular channel 259 is fluidly connected to the at least one outlet 206. In some cases, the first annular channel 258 is also defined by the alignment flange 212. The first annular channel 258 and the second annular channel 259 are typically separated by an annular flange 261 extending from the outer surface of the second body. The annular flange 261 can limit or prevent fluid that is intended for the inlet from inadvertently circumventing flowing through the nozzle and passing directly to the second annular channel 259 and being delivered back to the torch body 102 via the coolant outlet/exit path. In some embodiments, in addition or alternatively to the annular flange 261 separating the first annular channel 258 (and inlet 204) and the second annular channel 259 (and outlet 206), the outer component can include a sealing element disposed between the first annular channel and second annular channel. For example, the sealing element can include an o-ring type seal or a surface-to-surface interface between the flange 261 and an adjacent component, such as a retaining cap or swirl ring.

The size and configuration of the annular channels can vary based on the desired flow paths delivered to and from the nozzle. In some embodiments, the first annular channel 258 connected to the inlet 204 can be positioned at a closer longitudinal position to the proximal end 211B than the second annular channel 259 connected to the outlet 206. In some embodiments, the distal surface 214 of the alignment flange 212 together with the first annular channel 258 forms the inlet 204. The first annular channel 258 can define an axial length 258L and a radial depth 258D. The second annular channel 259 can define an axial length 259L and a radial depth 259D. In some embodiments, the axial length 258L of the first annular channel 258 is greater than the axial length 259L of the second annular channel 259.

Figure 4:
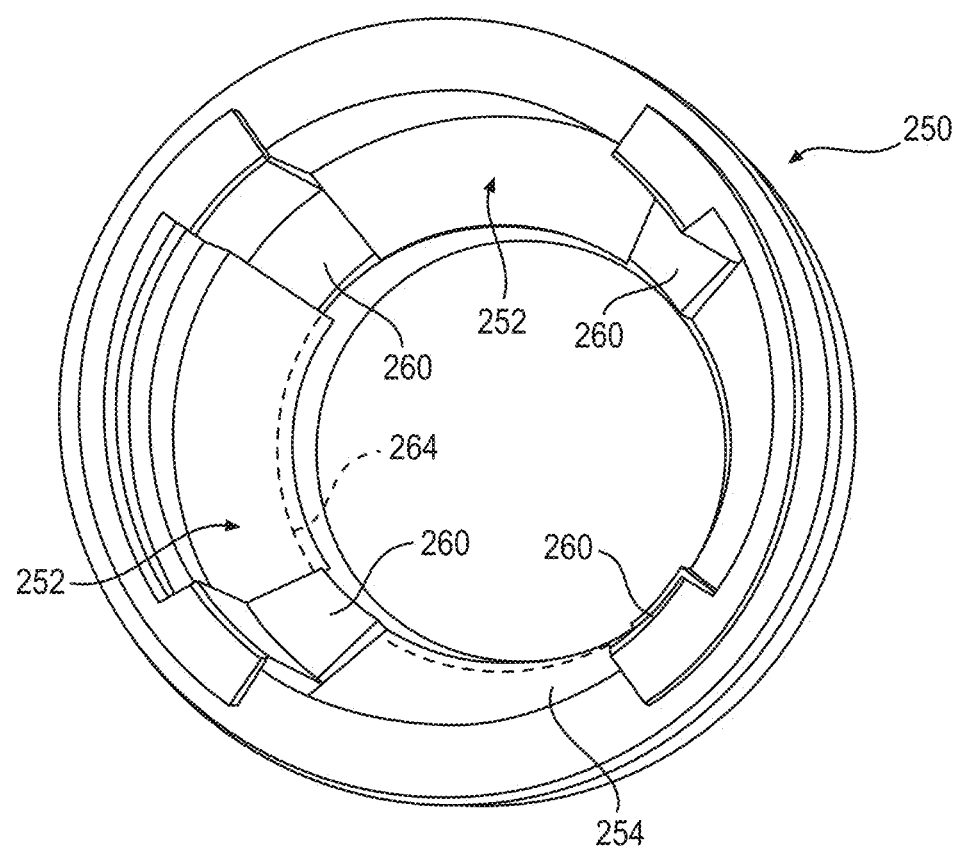
FIG. 4 is a perspective view of an interior surface of an example outer component of the two-piece nozzle illustrating coolant flow paths.
Figure 5:
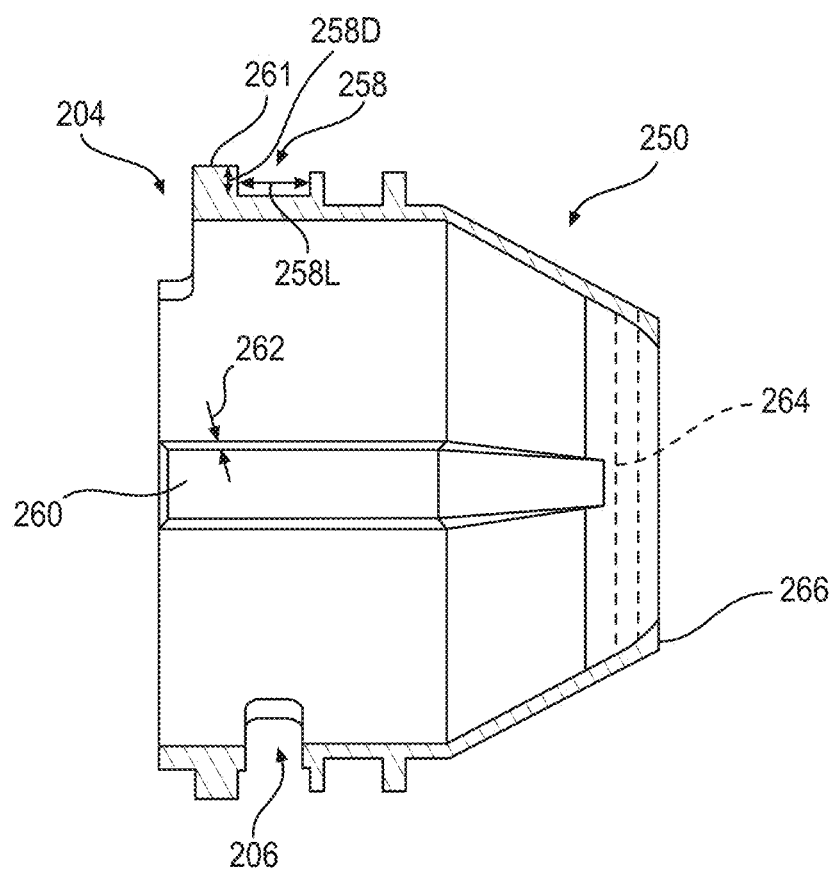
FIG. 5 is a cross sectional view of the example outer component of the two-piece nozzle illustrating flow features defining the coolant flow paths.
Figure 6:
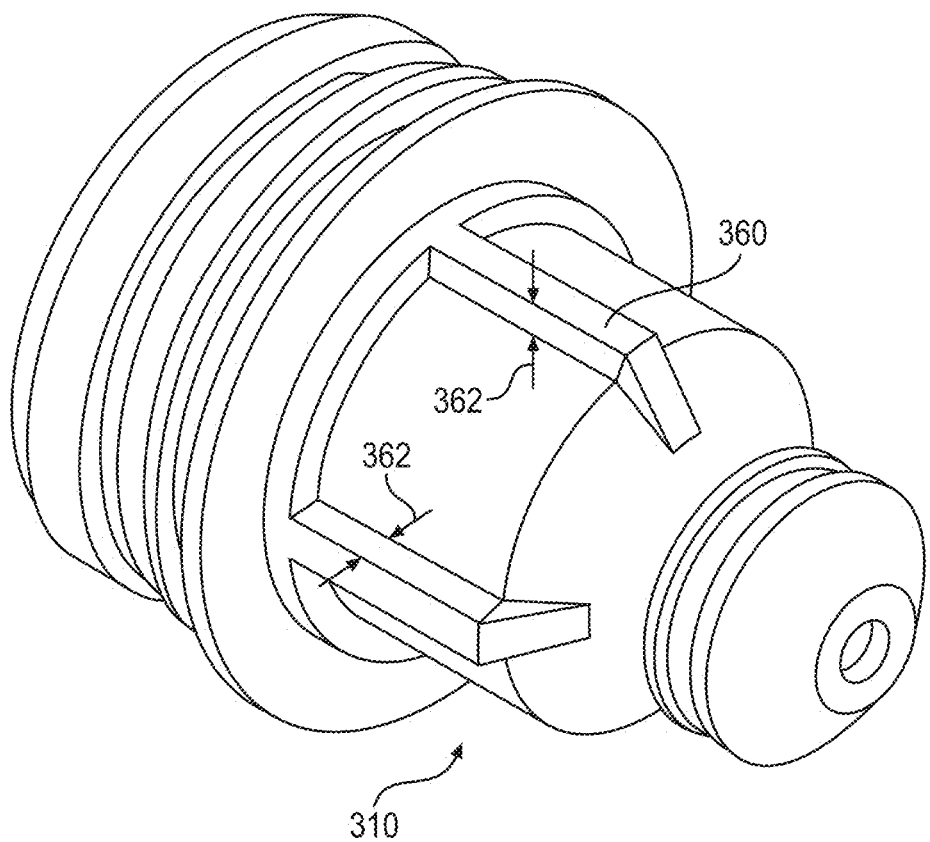
FIG. 6 is a perspective view of an example inner component of a two-piece nozzle having flow features along its outer surface.

In some embodiments, the flow channels 252 and resulting liquid flow passages are defined by flow features 260 along the internal surface of the outer component. Conventional nozzles define flow features on external surfaces of components as these are much easier to access and machine during manufacturing whereas internal surfaces are notoriously difficult to access and intricately machine. As illustrated, the flow features 260 can include raised projections or flanges that extend inwardly from the internal surface. In some embodiments, the flow features 260 can be formed as axial strips that are generally parallel with the longitudinal axis 211C. The flow features 260 can have a radial height 262 that corresponds to a radial width of a gap formed between the inner and outer components when assembled to one another. For example, the radial height 262 along the axial length of the flow feature 260 can be large enough to inhibit coolant from flowing between the flow feature 260 and the interior component 210 in the flow feature 260 region. In some cases, the flow feature 260 can be defined by a radial height 262 that corresponds to an outer profile of the interior component 210 so that a surface-to-surface seal is formed between the flow feature 260 and the interior component 210. The nozzles described herein can include any number of flow features 260 depending on the number of inlets and outlets to be used. For example, FIG. 4 illustrates an embodiment in which the outer component 250 includes four flow features 260, which can direct liquid coolant flow between two inlets and two outlets. Whereas, FIG. 5 illustrates an example in which the outer component 250 includes two flow features (for the sake of clarity, only one feature is shown because FIG. 5 is a cross sectional view), which can direct flow between one inlet and one outlet.

In some embodiments, the set of liquid flow passages include at least one annular passage (e.g., annular flow channel) 264 formed between the interior component 210 and the outer component 250 formed along a portion of or the entire circumference of the nozzle 200. The annular passage 264 can be formed at an end of the set of channels 252 formed on the internal surface. The annular passage 264 can also be partially defined by the interior component 210. The annular passage 264 can provide a location wherein a coolant flowing axially towards the distal end 211C can change direction by flowing around the flow feature 260 and back towards the proximal end 211B and out of the nozzle outlet 206.

The nozzle typically includes a seal 230 formed between the interior component 210 and outer component 250 that helps retain fluid within the liquid flow passages inside the nozzle. The fluid seal can limit (e.g., prevent) liquid from flowing from the distal end. The seal can include any of various sealing techniques including an o-ring or a surface-to-surface contact seal. In some embodiments, the interior component 210 can include or define a step feature 217 at its forward end, which can serve to engage a forward end of the outer component 250 to form a seal. The step can also be used to set an axial length between the interior component 210 and the outer component 250 and an axial length of the coolant channel.

The components of the nozzle 200 can be formed of any of various different structurally and electrically suitable materials. For example, the interior component 210 can be formed of a conductive, metallic material, such as copper. The outer component 250 can be formed of various materials for different performance purposes. In some embodiments, the outer component 250 can be formed of a metal material, such as brass or copper.

In some embodiments, the outer component 250 can be formed at least partially of a non-electrically conductive (e.g., electrically insulative) material. The outer component 250 formed at least partially of the non-electrically conductive material can help limit electrical arcing between the nozzle 200 and an adjacent shield 300. In some cases, the outer component 250 can include at least a portion (e.g., an outer coating) of the non-electrically conductive material. In some cases, the outer component 250 can be substantially formed of the non-electrically conductive material throughout its thickness (e.g., substantially completely formed of the non-electrically conductive material). In some embodiments, the non-electrically conductive material can include a plastic material. In some cases, the plastic material can include polyether ether ketone (PEEK).

The multi-component nozzle 200 can be assembled in several different ways. For example, in some embodiments, the interior component 210 and outer component 250 can be press fit to one another. A press-fit connection can be used, for example, in embodiments where both components are made of metal materials, such as copper or brass. In some cases, the interior component 210 can be formed of a copper material and the outer component can be formed of a brass material 250.

In some embodiments, the interior component 210 and outer component 250 can be snap-fit to one another. A snap-fit connection can be used, for example, in embodiments where the components are made of different materials, such as an interior component 210 formed of a metal material, such as copper and an outer component 250 formed of a different, more flexible material, such as a plastic material. In some embodiments, the outer component 250 can include one or more features configured to help the snap-fit connection. For example, at its distal end, the outer component 250 can have a reduced diameter engagement area 266 that forms a radial interference with the inner component. That is, the outer component 250 can include a reduced diameter engagement area in the form of a circumferential lip 266 feature to engage the inner component.

While the systems and methods herein have generally been described and illustrated as having an interior component that is substantially rotationally symmetric and the outer component having the asymmetric flow features that define the liquid coolant flow paths, other embodiments are possible. For example, alternatively or additionally, referring to FIG. 6, an interior component 310 can include one or more flow features 360 that define the flow channel between the interior component and the outer component. Unless otherwise described, the flow features 360 and flow channels defined by the flow features 360 can include similar or same features and properties as the flow features 260 of the interior component 210. For example, the flow features 360 can have a radial height 362 that corresponds to an internal profile of the outer component so that a surface-to-surface seal is formed between the flow feature 360 and the outer component. Other features of the interior component 310 can also be similar or the same as those of the interior component 210.

While various embodiments have been described herein, it should be understood that they have been presented and described by way of example only, and do not limit the claims presented herewith to any particular configurations or structural components. Thus, the breadth and scope of a preferred embodiment should not be limited by any of the above-described exemplary structures or embodiments, but should be defined only in accordance with the following claims and their equivalents.

What is claimed:

1. A nozzle for a plasma arc torch, the nozzle comprising:
a first body having a first tip end, a second end, and a longitudinal axis, the first body comprising an axial alignment flange having i) a proximal surface configured to mate with a torch body of the plasma arc torch and to position the nozzle axially within the torch and ii) an opposing distal surface exposed to liquid coolant flow; and
a second body disposed about a portion of the first body to complement the first body, the second body comprising a set of axial features extending inwardly from an internal surface of the second body, the axial features having a radial height sufficient to contact the first body and being shaped to form a coolant loop of a set of longitudinal liquid flow passages between the first body and the second body,
the second body at least partially defining at least one radial coolant inlet and at least one radial coolant outlet to the set of longitudinal liquid flow passages, the at least one radial coolant inlet and at least one radial coolant outlet being defined at or near a proximal end of the second body, the distal surface of the alignment flange and an annular channel defined at the proximal end of the second body together forming the at least one inlet; and
a fluid seal formed between the first body and the second body at or near the first tip end to limit liquid within the coolant loop from exiting the nozzle at the tip end of the nozzle.

2. The nozzle of claim 1 wherein the second body is formed of an electrically insulative material.

3. The nozzle of claim 1 wherein an outer surface of the second body defines a set of outer annular channels, a first annular channel of the set being the annular channel defined at the proximal end of the second body forming the at least one inlet with the alignment flange and a second annular channel of the set is fluidly connected to the at least one outlet.

4. The nozzle of claim 1 wherein the first body is rotationally symmetric about the longitudinal axis.

5. The nozzle of claim 1 further comprising at least one annular passage, at least one of the annular passages being formed at an end of the longitudinal liquid flow passages.

6. The nozzle of claim 1 wherein the second body comprises an electrically insulative portion.

7. A nozzle for a liquid-cooled plasma arc torch, the nozzle comprising:
a first body comprising a distal tip end, a proximal end, and a central axis, the first body comprising an alignment flange having i) a proximal surface configured to mate with the plasma arc torch and to position the nozzle axially within the torch and ii) an opposing distal surface exposed to liquid coolant flow;
a shell, formed of a non-electrically conductive material, disposed about a portion of the first body, the first body and the shell together defining a fluid flow path shaped to direct coolant flow between the first body and the shell through a coolant loop with a set of longitudinal liquid flow passages between the first body and the shell formed; and a fluid seal formed between the first body and the shell at or near the distal tip end to limit liquid within the coolant loop from exiting the nozzle at the distal tip end of the nozzle.

8. The nozzle of claim 7 wherein the non-electrically conductive material comprises a plastic material.

9. The nozzle of claim 7 wherein the shell is substantially fully formed of the non-electrically conductive material.

10. The nozzle of claim 7 wherein the shell is partially formed of an electrically conductive material.

11. The nozzle of claim 10 wherein the shell comprises a coating of the non-electrically conductive material.

12. The nozzle of claim 7 wherein the set of longitudinal liquid flow passages is defined by one or more features extending from an internal surface of the shell.

13. The nozzle of claim 7 wherein the first body and the shell are snap-fit to one another.

14. The nozzle of claim 7 wherein the shell limits electrical arcing between the nozzle and an adjacent shield.

15. A nozzle for a liquid-cooled plasma arc torch, the nozzle comprising:
a conductive body having a first tip end, a second end, and a longitudinal axis, the conductive body comprising an alignment flange having a distal surface exposed to liquid coolant flow;
a second body, formed of a non-electrically conductive material, disposed about a portion of the conductive body, the second body comprising:
an internal surface shaped to complement the conductive body to form a set of fluid flow passages forming a liquid cooling loop between the conductive body and the second body; and
an outer surface defining a set of annular channels, an inlet to the liquid cooling loop being at least partially defined within a first annular channel of the set and an outlet to liquid cooling loop being at least partially defined within a second annular channel of the set, the first annular channel being disposed at a closer longitudinal position to the second end than the second annular channel; and
a fluid seal formed between the conductive body and the second body at or near the first tip end to limit liquid within the coolant loop from exiting the nozzle at the first tip end.

16. A nozzle for a liquid-cooled plasma arc torch, the nozzle comprising:
a first body having a first end, a second end, and a longitudinal axis, the first body comprising an outer axial alignment flange having a proximal surface configured to mate with a torch body and an opposing distal surface exposed to liquid coolant flow; and
a second body disposed about a portion of the first body, the second body comprising:

an outer surface defining a set of annular channels, at least one inlet to a liquid cooling loop being at least partially defined within a first annular channel of the set and at least one outlet to the liquid cooling loop being at least partially defined within a second annular channel of the set,
the distal surface of the alignment flange and the first annular channel together forming the inlet; and
a seal between the first body and the second body at or near the first end to limit liquid within the coolant loop from exiting the nozzle at the first end.

17. The nozzle of claim 16 wherein the first annular channel is disposed at a closer longitudinal position to the second end than the second annular channel.

18. The nozzle of claim 16 wherein the first annular channel and the second annular channel are separated by an annular flange extending from the outer surface of the second body.

19. The nozzle of claim 16 wherein the at least one inlet spans about 5 percent to about 35 percent of the circumference of the second body.

20. The nozzle of claim 16 wherein the first annular channel is also defined by the alignment flange.

21. The nozzle of claim 20 wherein an axial length of the first annular channel has an axial length that is greater than an axial length of the second annular channel.

22. A nozzle for a liquid-cooled plasma arc torch, the nozzle comprising:
a first body having a forward end, a rear end, and a longitudinal axis, the first body comprising an outer axial alignment flange disposed between the forward end and the rear end, the outer axial alignment flange having the largest diameter of the nozzle and having a rear face to directly align the nozzle with a torch body thereby positioning an exit orifice of the nozzle relative to an electrode installed in the torch body and a front face that forms at least a portion of an inlet passage of a coolant channel;
a shell disposed about a portion of the first body and forming a sealed forward end with the first body, the first body and the shell together defining the coolant channel between the first body and the shell; and
a sealing element between the first body and the shell at or near the forward end to limit liquid within the coolant channel from exiting the nozzle at the forward end.

23. The nozzle of claim 22 wherein the first body and the second body together define a channel around a perimeter of the nozzle for coolant to flow around and then into the shell.

24. The nozzle of claim 22 wherein the shell defines a coolant inlet and a coolant outlet at its rear end.

25. The nozzle of claim 22 wherein the first body defines a step feature at its forward end.

26. The nozzle of claim 25 wherein the step feature engages the forward end of shell to set an axial length of the coolant channel.

* * * * *